A. WALTNER.
MUZZLE.
APPLICATION FILED MAR. 12, 1920.

1,362,276.

Patented Dec. 14, 1920.

INVENTOR
Albert Waltner
BY
ATTORNEY

UNITED STATES PATENT OFFICE.

ALBERT WALTNER, OF BROOKLYN, NEW YORK.

MUZZLE.

1,362,276.  Specification of Letters Patent.  Patented Dec. 14, 1920.

Application filed March 12, 1920. Serial No. 365,274.

*To all whom it may concern:*

Be it known that I, ALBERT WALTNER, a citizen of the United States, and resident of the borough of Brooklyn, in the county of Kings and State of New York, have invented certain new and useful Improvements in Muzzles, of which the following is a specification.

This invention relates to muzzles for dogs and other animals, and my improvement is directed particularly to the production of a muzzle that is yieldable, both vertically and laterally, for adjustability, and to permit within its confines a degree of movement for the animal's jaws, but the structure of said muzzle being of such character that it is form maintaining, while being capable of flexure.

The essential features in a muzzle are (1) that it shall be flexible to fit upon dogs' heads of about the same size and shape, (2) that while strongly built, no part of the muzzle will be caused to exert a chafing effect upon the dog's mouth or jaws, and (3) that it leaves the dog's nose-tip exposed, and its windpipe in non-contacting relation with the muzzle to be thus free from pressure.

Therefore my improved muzzle consists of a number of sections of stout wire, each preformed to serve special functions and all linked together in an assembled structure which embodies the characteristics of the invention.

Other features and advantages of my said invention will hereinafter appear.

In the drawing:—

Figure 1:
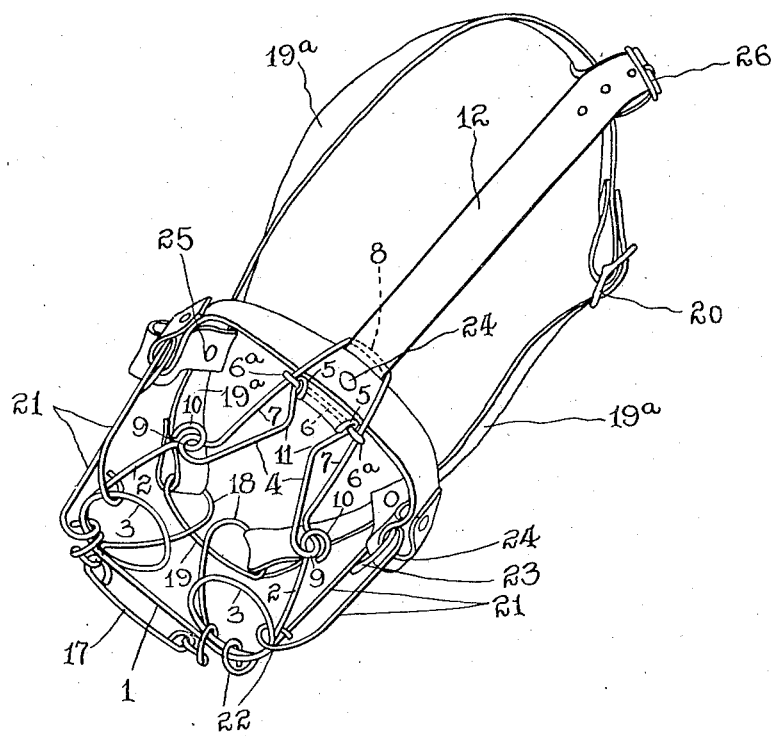
Figure 1 is a perspective view of my improved muzzle.
Figure 2:
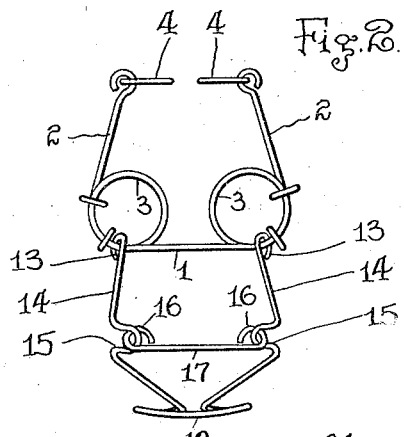
Fig. 2 is a front elevation thereof.

Essentially my improved muzzle is composed of a number of differently shaped wire elements, including a vertical front element, a base element extending rearwardly therefrom, an upper element extending rearwardly therefrom, and opposite side elements extending rearwardly therefrom.

The vertical front element consists of a preformed strand having the horizontal portion 1, vertical side portions 2, 2 and loops 3, 3, produced by coiling the strand between the horizontal portion 1 and each of the vertical portions 2, this vertical front element thereby constituting a front guard for the teeth of the dog, because the loops 3 extend inwardly toward each other from the side portions 2. The loops 3, 3, however, in the fitted position of the muzzle upon a dog's head, occupy a position which is below the dog's nose tip, since it is the purpose with this device to leave said nose tip freely exposed. Thus the upper muzzle element consists of a strand preformed with the rearwardly converging portions 4, 4, whose length is determined by the nose length of the animal to be equipped, said strand engaging at the rear ends of portions 4, 4, by terminal side loops 5, 5 thereon, with a transverse bar 6, whose ends are formed into loops $6^a$, $6^a$, whereby said bar 6 engages respectively with outer portions 7, 7, that lie in the same horizontal plane as portions 4, 4, with a continuous rear bend 8, and respective, out-turned junctions with the portions 4, 4, in the form of forward loops 9, 9. The side portions 2, 2, at their terminals, are formed into loops 10, 10, which, respectively, have linked engagement with the loops 9, 9. The rearwardly converging portions 4, 4, which leave a wide front opening for the free protrusion of the dog's nose tip, are shown in the drawing as convergent only to an intermediate point 11 of their length, the rearward continuations thereof, which terminate in the loops 5, 5, being divergent in order that their loop terminals may be spaced sufficiently to admit between them a head strap 12 which is drawn around the transverse bar 6. The base element comprises a strand having terminal loops 13, 13, which are respectively engaged with the loops 3, and rearwardly extending portions 14, 14, which depend, with outward curvature, to the points 15, 15, where each portion 14 is inwardly recessed, to receive the looped ends 16, 16, of a transverse bar 17, and to localize the latter as an expansion restraining link for the portions 14, which portions thence extend rearwardly in converging manner to a point where they will be adjacent the dog's neck, in service, where said portions are bent to form the rear loops 18, 18, by folding forwardly the rear juncture portion 19 of the strand. This leaves the portions 14 separated at their rear ends and provides a clearance to expose the dog's windpipe and prevent pressure thereon. A neck strap, formed in two sections, $19^a$, $19^a$, is connected by each section respectively with the loops 18, 18, said strap sections having suitable engaging means, as the buckle 20.

The cheek or side guard members of the muzzle are composed respectively of a strand having the substantially parallel portions 21, 21, lying in approximately the same vertical plane, the forward ends of said portions having terminal loops 22 which engage a loop 3, and the continuous rear end of said strand being coiled into a loop 23.

Each loop 23 engages an end of a saddle strap 24 that lies beneath the rear end of portions 7, 7, over head strap 12, to which latter it is secured, as by rivet 24, the head strap 12 thence being drawn around the front of bar 6, and up and over the rear bend 8, in the assembled arrangement whereby the straps and wire elements coördinate their respective functions; the portion of strap 12 lying between bar 6 and bend 8 forming a pad for contact with the dog's nose ridge.

Also each loop 23 engages a short strap 25, shown in doubled form, riveted, and at its outer end slidably engaging a neck strap section 19ª. A buckle element 26 is slidably mounted on one of the strap sections 19ª for engagement by the head strap 12.

It should be noted that the front space which is bounded vertically by the horizontal bars 1 and 17 and the side portions 14 permits movement of the dog's lower jaw and the extension of its tongue for drinking purposes.

With the linked interconnected arrangement of the several elements composing my improved muzzle it will be apparent that the structure thereof is capable of distension or flexure either vertically or laterally, thus rendering the same adaptable, through inherent adjustability, to non-chafingly encompass the jaws of different dogs whose characteristic head features are similar in size and contour.

Variations may be resorted to within the spirit and scope of my said invention and parts thereof used without others.

I claim:—

1. A muzzle composed of stiff wire elements, including a front guard element, upper and lower rearwardly extending elements, neck and head straps therefor, and side elements, all in loosely linked engagement, to render the muzzle capable of either vertical or lateral flexure or adjustment.

2. A muzzle composed of wire elements, in loosely linked engagement, including a front guard element and an upper element extending rearwardly therefrom, the junction between said front guard and upper elements leaving a clearance for protrusion of the nose tip of the animal with which the muzzle is used.

3. A muzzle composed of wire elements, in loosely linked engagement, including a front guard element and a lower element extending rearwardly therefrom the junction between said front guard and lower elements leaving a clearance for protrusion of the tongue of the animal with which the muzzle is used.

4. A muzzle composed of wire elements, in loosely linked engagement, including a front guard element and a lower element extending rearwardly therefrom, said lower element having looped rear terminal portions, separated to afford a clearance to avoid pressure upon the windpipe of the animal with which used, and neck strap sections engaged with said looped portions.

5. A muzzle composed of wire elements, including a front guard element, which consists of a lower horizontal portion, side coils that guard the animal's teeth, and upright side portions with terminal loops, an upper rearwardly extending element, to form inner and outer portions, doubled for a part of its length and having forward loops for loosely linked engagement with the loops of said upright portions respectively, the inner portions of said upper element being convergent to provide with the space bounded by said coils and upright portions a clearance for the animal's nose tip, and said convergent portions expanding and having terminal loops, a transverse bar in loosely linked engagement with said terminal loops, said bar being in loosely linked engagement with the outer portions of said rearwardly extending element, said outer portions having a closed terminal bend, a saddle strap, lying beneath said outer portions, a head strap secured to said saddle strap, said head strap passed down and under said transverse bar and upwardly over said terminal bend to form a nose bridge pad; a lower rearward element, and opposite side elements, all in loosely linked relation with said front guard element to permit vertical and lateral flexure of said muzzle.

6. A muzzle composed of wire elements including a front guard element with separated side coils and having a horizontal portion, a lower rearwardly extending element comprising separated portions which terminate forwardly in looped terminals, which are respectively in loosely linked engagement with said coils, said separated portions having localizing recesses, a transverse bar in loosely linked relation with said recesses, leaving a clearance for protrusion of the animal's tongue in service, and said separated portions extending rearwardly in converging relation from said recesses to terminal looped formations, to respectively receive the ends of neck strap sections, the rear loop closure portion of said element being bent forwardly, leaving a clearance to avoid pressure upon the animal's windpipe, an upper rear element, and opposite side elements all in loosely linked relation with said front guard element, to permit vertical and lateral flexure of the muzzle.

7. A muzzle composed of stiff wire elements, including a front guard element, and surrounding elements in loosely linked engagement therewith, together with flexible securing means.

Signed at the borough of Manhattan in the city, county and State of New York this 9th day of March A. D. 1920.

ALBERT WALTNER.